United States Patent
Denicola, Jr. et al.

(10) Patent No.: US 10,370,466 B2
(45) Date of Patent: Aug. 6, 2019

(54) PROCESSING AID AND BLEND EMPLOYING THE PROCESSING AID FOR ACHIEVING EFFECTIVE ORIENTATION OF AN EXTRUDED FILM LAYER AND A BIAXIALLY ORIENTED FILM INCLUDING SUCH FILM LAYER

(71) Applicant: Taghleef Industries Inc., Newark, DE (US)

(72) Inventors: Anthony J. Denicola, Jr., Old Lyme, CT (US); Andrew F. Wilkie, Avondale, PA (US)

(73) Assignee: TAGLEEF INDUSTRIES INC., Newark, DE (US)

( * ) Notice: Subject to any disclaimer, the term of this patent is extended or adjusted under 35 U.S.C. 154(b) by 11 days.

(21) Appl. No.: 15/544,991

(22) PCT Filed: Jan. 21, 2016

(86) PCT No.: PCT/US2016/014289
§ 371 (c)(1),
(2) Date: Jul. 20, 2017

(87) PCT Pub. No.: WO2016/118729
PCT Pub. Date: Jul. 28, 2016

(65) Prior Publication Data
US 2018/0009917 A1    Jan. 11, 2018

Related U.S. Application Data

(60) Provisional application No. 62/105,865, filed on Jan. 21, 2015.

(51) Int. Cl.
| | |
|---|---|
| C08F 110/06 | (2006.01) |
| C08L 23/10 | (2006.01) |
| C08L 23/12 | (2006.01) |
| B32B 27/08 | (2006.01) |
| B32B 27/32 | (2006.01) |
| B32B 37/15 | (2006.01) |
| C08J 5/18 | (2006.01) |

(52) U.S. Cl.
CPC ............ *C08F 110/06* (2013.01); *B32B 27/08* (2013.01); *B32B 27/327* (2013.01); *B32B 37/15* (2013.01); *C08J 5/18* (2013.01); *C08L 23/10* (2013.01); *C08L 23/12* (2013.01); *B32B 2307/518* (2013.01); *B32B 2307/54* (2013.01); *B32B 2307/704* (2013.01); *B32B 2391/00* (2013.01); *C08J 2323/12* (2013.01); *C08J 2423/12* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 2,835,659 A | * | 5/1958 | Guillet | C08F 8/50 528/481 |
| 3,862,069 A | * | 1/1975 | Cruz, Jr. | C08J 7/12 524/582 |
| 5,330,568 A | * | 7/1994 | Park | C08F 8/50 106/270 |
| 6,143,846 A | * | 11/2000 | Herrmann | C08F 10/06 526/160 |
| 6,927,258 B2 | * | 8/2005 | Datta | C08L 23/10 525/240 |
| 9,039,862 B2 | | 5/2015 | Lotz et al. | |
| 9,228,068 B2 | | 1/2016 | Ackermans et al. | |
| 2006/0015125 A1 | * | 1/2006 | Swain | A61B 17/0401 606/151 |
| 2006/0105125 A1 | * | 5/2006 | Musgrave | B32B 27/08 428/35.2 |
| 2007/0191510 A1 | * | 8/2007 | Chaiko | C08K 9/04 523/205 |
| 2009/0036619 A1 | * | 2/2009 | Herrmann | C08F 10/06 526/127 |
| 2011/0021103 A1 | * | 1/2011 | Alper | B32B 5/26 442/329 |
| 2013/0186566 A1 | * | 7/2013 | Lotz | C09J 123/142 156/334 |
| 2015/0299525 A1 | * | 10/2015 | Bunnelle | C09J 123/0815 524/528 |

FOREIGN PATENT DOCUMENTS

| | | |
|---|---|---|
| CN | 103124777 A | 5/2013 |
| CN | 103906796 A | 7/2014 |
| EP | 1938941 A1 | 2/2008 |
| EP | 1938941 A1 | 7/2008 |

OTHER PUBLICATIONS

International Search Report from corresponding PCT/US2016/014289 dated Mar. 31, 2016.

* cited by examiner

*Primary Examiner* — Peter A Salamon
(74) *Attorney, Agent, or Firm* — Caesar Rivise, PC

(57) ABSTRACT

Processing aid for aiding in orienting an extruded film layer including a preponderance, by weight, of a high crystalline polypropylene is a crystalline polypropylene wax. An oriented film layer including a blend of crystalline polypropylene wax and high crystallinity polypropylene homopolymer is part of the invention. The invention includes a method of forming an oriented film layer including a preponderance by weight of a high crystallinity polypropylene and includes the steps of blending a high crystallinity polypropylene with a crystalline polypropylene wax, directing the blend through an extruder to form a film layer and then orienting the film layer. The invention includes a biaxially oriented, multi-layer film including a base layer and at least one skin layer. The base layer includes a blend of crystalline metallocene catalyzed polypropylene wax and a high crystallinity polypropylene.

6 Claims, 1 Drawing Sheet

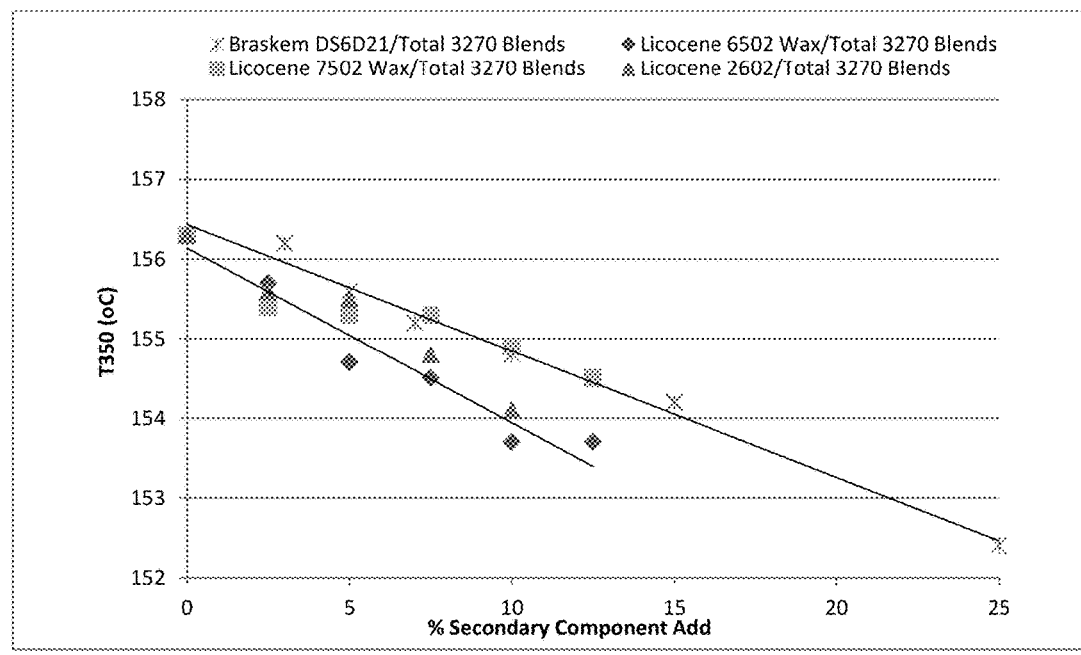

PROCESSING AID AND BLEND EMPLOYING THE PROCESSING AID FOR ACHIEVING EFFECTIVE ORIENTATION OF AN EXTRUDED FILM LAYER AND A BIAXIALLY ORIENTED FILM INCLUDING SUCH FILM LAYER

FIELD OF THE INVENTION

This invention relates to a processing aid for use in effectively orienting an extruded film layer; most preferably a film layer constituting a core layer of a multilayer extruded film. The invention also relates to an oriented film layer including a blend employing the processing aid for forming a film layer, a method of forming the film layer and a biaxially oriented, multilayer film employing the film layer as a core or base layer of such structure.

BACKGROUND ART

High crystalline/high tacticity (low xylene soluble levels less than 3%) polypropylene homopolymers, such as, Total 3270, Phillips 66 CH020XK, or Braskem Inspire 6025 are used as the core resin in several clear and cavitated multilayer, extruded biaxially oriented film structures where maximized stiffness and tensile strength are desired.

These high crystalline polypropylene homopolymers are very difficult to uniformly orient and/or avoid breakage during the orientation process. Compared to forming biaxially oriented film with conventional, low or medium crystalline polypropylene as the core layer; forming a biaxially oriented film with high crystalline polypropylene as the core layer requires higher machine direction orientation (MDO) and transverse direction orientation (TDO) stretch temperatures, and often requires lower line speeds to allow for sufficient heating in the ovens during the pre-draw and draw stages. High MDO stretch temperatures can be particularly problematic with film structures in which one or both skin layers comprise a low melting point copolymer as a primary component.

In order to reduce the stress to orient and/or the necessity to raise the temperatures to orient a cast sheet employing a high crystalline polypropylene homopolymer in the core layer of a multi-layer, biaxially oriented film, it has been suggested to utilize, or add, polypropylene copolymers and homopolymers to the high crystalline core as a processing aid. For example, both Basell Adsyl 7416 (copolymer with ~5% ethylene, 7.5 dg/min MFR, 133° C. melting point) and Braskem DS6D21 (copolymer with ~2.5% ethylene, 8 dg/min MFR, 146° C. melting point) ethylene propylene random copolymers have been used effectively to improve the processability and line rate efficiency in forming a multi-layer, biaxially oriented film employed as a base film for a metallized film structure and employing either Total 3270, Phillips 66 CH020XK, or Braskem Inspire 6025 (i.e., high crystalline polypropylene homopolymer) as the primary core resin. The inclusion of the polypropylene copolymers as a processing aid for a high crystalline polypropylene core layer reduces the stress to orient the film.

However, this reduction in stress to biaxially orient the film and the corresponding improvement in processability on a continuous tenter line comes at the expense of several key film properties; most notably tensile modulus and strength.

It also has been suggested to employ a high melt flow polypropylene homopolymer as a processing aid to reduce extrusion pressure below the maximum safe operating pressure, as disclosed in Ackermans et al. US publication 2014/0343230. Typical commercially available grades of metallocene-catalyzed polypropylene within the melt flow range described in Ackermans et al, and which are sold into the melt blown fiber industry are Metocene MF650W, Metocene MF650X and Metocene MF650Y; sold by Equistar Chemicals, L.P. (a wholly owned subsidiary of LyondellBasell Industries, Houston, Tex.). These commercial grades of metallocene-catalyzed homopolymers have not provided the desired degree of stress reduction in the film orientation process.

Crystalline polypropylene waxes, including crystalline metallocene catalyzed polypropylene waxes are known, but have not been recognized or known to be an effective processing aid in the extrusion formation of a film layer from predominately high crystalline polypropylene homopolymer.

Specifically polypropylene waxes are used industrially in many ways, e.g., as dispersants for pigments for coloring thermoplastic polymers, as auxiliaries in plastics processing, as matting and abrasion protection additives in printing inks and surface coatings, as constituents of photo toner compositions and in formulations for hot melt compositions. Many of these applications require high degrees of crystallinity and high melting points. For example, the heat resistance of hot melt compositions can be increased by use of polypropylene waxes having a high melting point. As matting and abrasion protection agents in printing inks and surface coatings, the waxes are used in milled, frequently also micronized, form. High degrees of crystallinity are advantageous here since these are associated with product hardness, which aids the milling process or is necessary to make the desired small particle size possible at all. In addition, high hardness produces an improved abrasion protection action.

However, none of the prior art known to applicant provides any teaching of the properties (e.g., crystallinity, melting point and viscosity) of crystalline polypropylene wax, e.g., crystalline metallocene catalyzed polypropylene wax, that are important, desired or required in order to effectively employ such waxes as a processing aid in accordance with this invention.

A need exists for processing aids for permitting the effective orientation of a film layer including high crystalline polypropylene homopolymer and preferably employed as a base or core layer, and or in one or more intermediate layers in a multilayer, coextruded, biaxially oriented film and that has advantages and/or benefits over prior art processing aids. The present invention is directed to such an improved processing aid for permitting the effective orientation of an extruded film layer; most preferably a film layer constituting a core layer and optionally one or more intermediate layers of a multilayer extruded film that is biaxially oriented, to an oriented film layer including a blend employing a processing aid for aiding in the effective orientation of the film layer, to a method of orienting the film layer and to a biaxially oriented, multilayer film employing the film layer as a core or base layer and/or one or more intermediate layers of such structure.

The invention described hereinafter employ cost effective processing aids that address the processability issues (e.g., uniform orientation of an extruded layer with minimal breakage) while minimizing the adverse effect on film properties such as tensile modulus and strength.

SUMMARY OF THE INVENTION

A processing aid in accordance with this invention for effectively aiding in the orientation of an extruded film layer including high crystalline polypropylene homopolymer is a crystalline polypropylene wax; preferably a metallocene catalyzed polypropylene wax. As noted above, although such crystalline polypropylene waxes are known, prior to this invention it was not known that such waxes were an effective processing aid in the orientation of an extruded film layer that included predominately a high crystalline polypropylene homopolymer.

Reference in this application to "polypropylene homopolymer(s)" or "polypropylene" unless indicated otherwise or more specifically limited, means a crystalline propylene homopolymer or a copolymer of propylene with another α-monoolefin having from 2 to 8 carbon atoms in an amount insufficient to have a significant effect on the crystallinity of the polypropylene. Typically, this is ethylene in an amount of less than 2%, and more preferably less than 1% by the weight of the polymer. These later copolymers also are sometimes referred to as "minirandom" homopolymers.

Reference to "high crystallinity polypropylene homopolymers" used in this invention means a polypropylene homopolymer (as defined above) having Xylene soluble levels lower than 3% unless otherwise defined and/or limited (compared to xylene solubles of 4-5% in "standard" homopolymer resins), a delta heat of fusion ($H_f$), as measured by DSC, of greater than 82 J/g, and an intermolecular stereoregularity greater than 93%. Most preferably the high crystalline polypropylene homopolymers employed in this invention have a Xylene soluble level below 2%.

Reference in this application to "polypropylene copolymer" unless indicated otherwise, means a copolymer of propylene with another α-monoolefin having from 2-8 carbon atoms in an amount of 2% or greater. Most preferably the polypropylene copolymer is a propylene/ethylene copolymer having an ethylene content of no more than 10% by weight.

Reference in this application to "α-monoolefin" unless indicated otherwise, means a linear unsaturated hydrocarbon monomer having one carbon-carbon double bond, which double bond is located at the end of the linear chain. The term is intended to include any such monomer having 8 carbon atoms or less, including ethylene and propylene.

Reference throughout this application to "crystalline polypropylene waxes" usable in this invention, unless otherwise specifically limited or defined, means such waxes including the following properties:
  a) A DSC peak melting point of greater than 80° C.;
  b) Viscosity, measured in the melt at 170° C., in the range from 20 to 30,000 mPa·s;
  c) A crystallinity as measured by DSC of greater than 5% and
  d) A weight average molecular weight, as measured by GPC, in the range from 3,000 to 30,000 Daltons In general, polypropylene waxes are materials which have low average degrees of polymerization or chain lengths compared to plastic-like polypropylene homopolymers. These characteristics in turn result in low melt viscosities which in the case of the waxes are typically in the range from about 20 to 30,000 mPa·s when measured at 170° C. In the case of polypropylene plastics, such as polypropylene homopolymers, the viscosity is generally above 100,000 mPa·s.

The preferred polypropylene waxes usable in this invention have a melting point greater than 130° C. and more preferably greater than 135° C. Most preferably the waxes used in this invention have a degree of crystallinity greater than 20%, preferably greater than 30%. Also, most preferably the polypropylene waxes employed in this invention have a viscosity, as measured at 170° C., of greater than 1500 mPa·s and a weight average molecular weight in the range of 15,000 to 30,000 Daltons.

There are several known methods for producing crystalline polypropylene waxes with characteristics described above. Thermal degradation of higher molecular weight crystalline isotactic polypropylene is one method of producing low-viscosity, crystalline wax. This approach is energy intensive and can sometimes lead to discolored product which contains double bonds. In the alternative, the production of isotactic polyolefin waxes by means of Ziegler-Natta supported catalysts, cocatalysts and stereoregulators at a temperature of over 95° C. is known. Large amounts of hydrogen have to be employed as a molar mass regulator.

A preferred method of producing crystalline polypropylene waxes is with the use of bridged metallocene compound catalysts with hydrogen as a molar mass regulator. Waxes produced by this method generally have low color and very good thermal stability due to the absence of unsaturation. Crystalline polypropylene waxes made by any of the above methods for producing crystalline polypropylene waxes are suitable for use in this invention. However, the most preferred wax presently known for use in this invention is a crystalline, metallocene catalyzed polypropylene wax.

The physical properties of polypropylene waxes (PP waxes) are significantly different from those of polypropylene plastics. Accordingly the fields of use also are different.
Test Procedure for Determining Properties of the Metallocene Catalyzed Polypropylene Waxes of this Invention
  Degree of Crystallinity The degree of crystallinity is calculated from the heat of fusion and is the proportion calculated by dividing the heat of fusion (J/g) calculated from the area of the melting peak measured using a differential scanning calorimeter (hereinafter referred to as DSC) by the theoretical heat of fusion 209 J/g of the perfect polypropylene crystal which is described in Polymer Handbook Third Edition (John Wiley & Sons Inc.) by J. Brandrups et al.

Weight Average Molecular Weight

The polymers and waxes are analyzed by gel permeation chromatography (GPC) to determine weight average molecular weight.

Melt Flow Rate

Melt flow rate is measured in accordance with ASTM D 1238-01 test method at 230° C. with a 2.16 kg weight for the propylene-based polymers.

Xylene Solubles

Xylene solubles are determined by dissolving 4 g. of sample into a 250 ml Erlenmeyer flask and adding 200 ml of inhibited xylene. After the sample is dissolved the flask is cooled to room temperature. During the cooling, the insoluble portion precipitates. The solution is filtered; then a 100 ml aliquot of the filtrate is placed in an aluminum pan and evaporated to dryness under a nitrogen stream. The solubles present are determined by weighing the residual polymer.

In the preferred embodiment of this invention, the film layer including the processing aid is a base layer and/or one or more intermediate layers coextruded as part of a multilayer structure including said base layer, optionally one or more intermediate layers and at least one skin layer.

This invention also includes an oriented film layer including a blend of a crystalline polypropylene wax; preferably a metallocene catalyzed polypropylene wax, and a high crystallinity polypropylene homopolymer. Preferably the blend is less than 10%, by weight, of the crystalline polypropylene wax and most preferably is in the range of 3-7.5%. However, in accordance with the broadest aspects of this invention higher weight percentages of the crystalline polypropylene wax may be employed. The upper, weight-percent limit is dictated by melt flow rate of the blend; too high a melt flow rate prevents effective formation of the extruded layer or multilayer film including that layer. Preferably the melt flow rate should be in the range of 0.5-6 dg/min MFR and more preferably in the range of 2-4 dg/min MFR.

This invention also includes a method of aiding in the orientation of an extruded film layer including a preponderance by weight of a high crystallinity polypropylene homopolymer, said method including the steps of blending a high crystallinity polypropylene homopolymer with a crystalline polypropylene wax, preferably a crystalline metallocene catalyzed polypropylene wax; forming the blend into an extruded film layer and then orienting the film layer; preferably in both the machine and transverse directions.

In accordance with the preferred method of this invention the step of orienting a film layer employing the blend of crystalline polypropylene wax and high crystallinity polypropylene homopolymer is part of a co-extrusion process for forming a multi-layer film wherein the film layer including the blend is the base layer of the multi-layer film. Most preferably the multi-layer film includes the base layer and at least one skin layer and the multilayer film is biaxially oriented.

In the most preferred embodiment the multi-layer film that is oriented includes at least three layers, with the layer including the blend of crystalline polypropylene wax and high crystallinity polypropylene homopolymer being the core layer and, if intermediate layers are included in the structure, the blend also can be included in one or more of such intermediate layers, either with or without being included in the core layer. Most preferably the multilayer film, either with our without intermediate layers includes skin layers substantially thinner than said core layer on opposed sides of said core layer.

A representative, non-limiting embodiment of this invention is a multilayer film comprising interlayers of the same or different thickness of 1 to 10 microns comprising high crystalline PP homopolymer and a crystalline metallocene catalyzed polypropylene wax in a ratio of more than 90% to less than 10%, preferentially 97-92.5% to 3-7.5%, plus additives or pigments as appropriate. A preferred embodiment comprises such interlayers and a core layer comprising high crystalline PP homopolymer and crystalline metallocene catalyzed polypropylene wax at a ratio of more than 90% to less than 10%, preferentially 97-92.5% to 3-7.5%, plus additives or pigments as appropriate This invention also includes a biaxially oriented, multi-layer film having a base layer and at least one skin layer on one side of said base layer, said base layer including a blend of crystalline polypropylene wax, preferably a crystalline metallocene catalyzed polypropylene wax, and a high crystallinity polypropylene homopolymer. Most preferably the weight percent of the crystalline polypropylene wax is less than 10% and most preferably in the range of 3% to 7.5%. However, as noted earlier, in accordance with the broadest aspects of this invention the weight percent of the polypropylene wax may be more than 10%; depending on the melt flow rate that is acceptable for forming the extruded film layer.

In the most preferred embodiment of the biaxially oriented, multi-layer film of this invention the machine direction and cross-direction tensile strength (psi) and the machine direction and cross direction tensile modulus (psi) of the multi-layer film are at least 90%, and in some cases over 100% of the machine direction and cross-direction tensile strength (psi) and the machine direction and cross direction tensile modulus (psi) of the same multi-layer film but excluding the crystalline polypropylene wax of this invention in the base layer.

BRIEF DESCRIPTION OF THE DRAWING

The FIGURE illustrates benefits achieved by the invention.

DESCRIPTION OF THE PREFERRED EMBODIMENTS OF THE INVENTION

In accordance with this invention processing aids for forming a biaxially oriented film layer including a preponderance, by weight, (preferably 90% of the polymer weight in the film) of a high crystalline polypropylene, or for forming a multilayer, biaxially oriented extruded film employing such a film layer, are crystalline polypropylene waxes introduced at low to moderate levels into a high crystalline polypropylene homopolymer employed to form the film layer. Applicant has discovered, quite surprisingly, that crystalline metallocene catalyzed polypropylene waxes employed in this invention achieve the processability benefits of the prior art processing aids while having either only a minimal adverse impact on the modulus and strength of the film layer or actually achieving an improvement in the modulus and strength of the film. This is far superior to prior art processing aids, such as the prior art copolymers discussed earlier herein.

The preferred embodiments of this invention include crystalline metallocene catalyzed polypropylene waxes as the processing aid and the following description will be limited to such waxes as the processing aid. However, as noted earlier, in accordance with the broadest aspects of this invention the crystalline polypropylene waxes need not be metallocene catalyzed. However, whether the crystalline waxes are metallocene catalyzed or not they should have the properties of crystalline polypropylene waxes set forth earlier in this application. Moreover, the weight percentages of the crystalline polypropylene waxes employed in this invention are the weight percentages of the crystalline metallocene waxes described herein.

A representative embodiment of a coextruded, biaxially oriented, multi-layer film of this invention includes a base layer and opposed skin layers. In one preferred embodiment the multilayer film is a three-layer structure including a base layer and opposed skin layers. However, in accordance with the broadest aspects of this invention the multi-layer film can include more than three layers, e.g., 5 layers, 7 layers, etc.

In a three layer structure a blend of the crystalline metallocene catalyzed polypropylene wax and the high crystalline polypropylene homopolymer is in the base layer. When the structure is more than three layers, e.g., a five layer structure including a base layer, intermediate layers on opposed sides of the base layer and skin layers on opposed sides of the intermediate layers, the blend of a crystalline metallocene catalyzed polypropylene wax and the high crystalline polypropylene homopolymer can be in the base layer and/or in one or more of the intermediate layers. However, regardless how the blend is distributed in the base layer and/or intermediate layers, in the preferred embodiment the total weight percent of the high crystalline polypropylene homopolymer and the crystalline metallocene catalyzed polypropylene wax in the blend or blends should be the same. In other words, the weight percentage of the crystalline polypropylene wax and high crystalline polypropylene homopolymer blend will be the same whether the blend only is in the base layer, is in one or more of the intermediate layers, or is in one or more of the intermediate layers and the base layer.

The thickness of multilayer structures including more than three layers generally is the same as a three layer structure and the skin layers are essentially of the same thickness as in a three layer structure. The total thickness of the intermediate layers and base layer of multilayer structures including more than three layers essentially is the same as the thickness of the core layer in a three layer structure. Therefore, the combination of the base layer and intermediate layers in a structure including more than three layers can essentially be viewed as the core component equivalent to the core layer of a three layer structure, and the blend of the crystalline polypropylene wax and crystalline polypropylene homopolymer can be distributed throughout the base layer and intermediate layers, as desired.

The remaining description, unless stated otherwise, will be directed to a three layer structure including a base layer and opposed skin layers. However, it is understood that multi-layer structures including more than three layers are within the scope of this invention, e.g., 5 layers, 7 layers, etc. Also in accordance with the broadest scope of this invention, when the multi-layer structure is more than 3 layers the percentages of the crystalline polypropylene wax and high crystalline homopolymer of the blend in the core layer of a three layer structure can be distributed in one or more of the core layer and/or intermediate layers.

The base or core layer of a representative embodiment of this invention includes a blend of a crystalline metallocene catalyzed polypropylene wax in a weight percent of 3-7.5% and over 90% high crystalline polypropylene homopolymer. Other well-known additives can be included in the base layer, as desired.

One of the skin layers can include one or more polypropylene random copolymer(s) and is intended to receive a metallized layer thereon. For example, and not by way of limitation, the copolymers can be a propylene/ethylene and/or propylene/butene copolymer. However, in accordance with the broadest aspects of this invention the composition of the skin layers can be varied and the films are not required to include a metallized layer.

The opposed skin layer can include a number of different polymers; including homopolymers, copolymers and terpolymer, as is well known in the art.

It should be understood that the invention is not limited to a three layer structure of the above construction or composition. For example, the skin layers can include a variety of different polymer compositions and additives depending upon the required properties of the skin layers, as are well known in the art.

Although the composition of the base layer also can be different than described above, in accordance with preferred aspects of this invention the base layer includes over 90% by weight high crystalline polypropylene homopolymer and less than 10% by weight of a crystalline metallocene catalyzed polypropylene wax; based on the total weight of the base layer. In accordance with a preferred embodiment of this invention the base layer of the three layer structure is the thickest component; constituting over 85% of the thickness of the multilayer film.

A representative, biaxially oriented, multi-layer film of this invention and made in accordance with the coextrusion method of this invention is a three-layer film including opposed skin layers and a core layer. The skin layers can be of any desired composition; depending upon the desired properties. The compositions of the skin layers do not constitute a limitation on the present invention.

In a representative embodiment of the invention the core layer includes 95% of a high crystalline polypropylene homopolymer designated Total 3270 and provided by Total Petrochemicals & Refining USA, located in La Porte, Tex. and 5% of a crystalline, metallocene catalyzed polypropylene wax sold under the designation Clariant Licocene PP 6502 by Clariant International LTD and located in Frankfurt Germany.

Referring to Table 1 below, comparative results of product made on a pilot line are reported for Example 1, made in accordance with this invention, Control Example 1, which is devoid of any processing aid and Comparative Example 1, which includes a prior art processing aid in the form of a copolymer.

Example 1 employed a crystalline metallocene catalyzed polypropylene wax, (Clariant Licocene PP 7502 provided by Clariant International LTD and located in Frankfurt Germany). Table 1 shows that the use of a crystalline metallocene catalyzed polypropylene wax in relatively small quantities as a processing aid for extruding a film including predominately Total 3270, a high crystalline polypropylene homopolymer, substantially improves processability relative to forming the film with the Total 3270 but without any processing aid (Control Example 1). Total 3270 is provided by Total Petrochemicals & Refining USA, located in La Porte, Tex. This improved processability was achieved while maintaining good modulus and strength retention when the crystalline, metallocene polypropylene wax was incorporated into the high crystalline polypropylene homopolymer in an amount of approximately 3%. In fact, the machine direction (MD) properties of the film made with the use of the crystalline metallocene catalyzed polypropylene wax as a processing aid actually slightly improved over the machine direction properties of the film formed of Total 3270, but without any processing aid.

In comparison with the use of a prior art, copolymer processing aid, e.g., the Braskem DS6D21 blend, with Total 3270 (i.e., a high crystalline polypropylene homopolymer) (Comparative Example 1), the use of a crystalline metallocene catalyzed polypropylene wax of this invention as the processing aid provided a noticeable incremental improvement in processability with a substantially improved balance of properties.

As is shown in Table 1, in accordance with this invention (Example 1) the machine direction and cross-direction tensile strength (psi) and the machine direction and cross direction tensile modulus (psi) of the multi-layer film are at least 90% of the machine direction and cross-direction tensile strength (psi) and the machine direction and cross direction tensile modulus (psi) of the same multi-layer film but excluding the metallocene catalyzed polypropylene in the base layer. In fact, the machine direction tensile strength and the machine direction modulus actually were higher in the film of this invention (Example 1), as compared to a prior art film that did not include any processing aid. (Control Example 1)

TABLE 1

|  | Control Example 1 | Comparative Example 1 |  | Example 1 |  |
|---|---|---|---|---|---|
| Core Resin | Total 3270 | Total 3270 |  | Total 3270 |  |
| Modifier Type | None | Braskem DS6D21 |  | Licocene PP 7502 |  |
| Weight % Modifier | 0 | 15 |  | 3 |  |
| Modifier MP (° C.) | na | 142 |  | 151 |  |
| Modifier % Crystallinity (by DSC) | na | 24.3 |  | 45.0 |  |
| Modifier Viscosity @ 170° C. (mPa · s) | na | — |  | 1,800 |  |
| Weight Average Molecular Weight | 352,000 [2] | ~287,000 [2] |  | 19,300 [2] |  |
| Gauge | 68 | 76 |  | 63 |  |
| MDO Temp (° C.) | 132 | 130 |  | 130 |  |
| TDO Temp (° C.) | 177 | 176 |  | 176 |  |
| % Haze | 1.1 | 3.1 |  | 2.2 |  |
| 45° Gloss | 88.7 | 84.9 |  | 88.3 |  |
| Tensile Strength (Psi) |  |  | % Change |  | % Change |
| MD | 29,095 | 25,947 | −10.8 | 29,361 | +0.9 |
| TD | 51,697 | 40,914 | −20.9 | 46,826 | −9.4 |
| Elongation (%) |  |  |  |  |  |
| MD | 171 | 168 |  | 164 |  |
| TD | 51 | 58 |  | 59 |  |
| Tensile Modulus (Psi) |  |  |  |  |  |
| MD | 380,372 | 317,939 | −16.4 | 386,685 | +1.7 |
| TD | 744,398 | 571,590 | −23.2 | 696,295 | −6.5 |
| Processability Rating (1-5) | 1 | 3 |  | 4 |  |
| 1 = poor |  |  |  |  |  |
| 5 = excellent |  |  |  |  |  |

[1] Mw of Core Resin
[2] Mw of Modifier

The test results reported in Table 2 below were obtained by evaluating a series of four Licocene PP crystalline, metallocene catalyzed waxes (all at 7.5%, by weight, of the film layer) in Total 3270 high crystalline, polypropylene homopolymer on applicant's pilot line. The waxes differed in melting point and/or viscosity at 170° C. but are all considered to be within the broad scope of this invention. As will be discussed in greater detail hereinafter, the use of Licocene PP 6502, 7502 and 2602 are considered more preferred that Licocene 6102.

Before discussing the results reported in Table 2 it should be noted that three important parameters of the metallocene catalyzed waxes employed in this invention are viscosity, crystallinity and melting point. If the viscosity is too low processability of the film can be adversely effected. If the crystallinity and melting point are two low physical properties of the film can be adversely affected.

Turning to Table 2, results are reported for Examples 2-5, which are within the scope of this invention, and the results for these latter four Examples are compared to Control Example 1, which had no processing aid, and Comparative Example 1, which had a prior art copolymer processing aid.

TABLE 2

|  | Control Example 1 | Comparative Example 1 | Example 2 |  | Example 3 |  | Example 4 |  | Example 5 |  |
|---|---|---|---|---|---|---|---|---|---|---|
| Core Resin | Total 3270 | Total 3270 | Total 3270 |  | Total 3270 |  | Total 3270 |  | Total 3270 |  |
| Modifier Type | None | Braskem DS6D21 | Licocene PP 7502 |  | Licocene PP 6502 |  | Licocene PP 6102 |  | Licocene PP 2602 |  |
| Weight % Modifier | 0 | 15 | 7.5 |  | 7.5 |  | 7.5 |  | 7.5 |  |
| Modifier MP (° C.) | na | 142 | 151 |  | 137 |  | 132 |  | 86 |  |
| Modifier % Crystallinity (by DSC) | na | 24.3 | 45.0 |  | 32.7 |  | 23.5 |  | 6.8 |  |
| Modifier Viscosity @ 170° C. (mPa · s) | na | — | 1,800 |  | 1,700 |  | 60 |  | 6,300 |  |
| Weight Average Molecular Weight | 352,000 [1] | ~287,000 [2] | 19,300 [2] |  | 18,500 [2] |  | 3,800 [2] |  | 27,700 [2] |  |
| Gauge | 68 | 69 | 66 |  | 58 |  | 58 |  | 67 |  |
| MDO Temp (° C.) | 132 | 137 | 135 |  | 135 |  | 138 |  | 138 |  |
| TDO Temp (° C.) | 177 | 174 | 175 |  | 172 |  | 174 |  | 178 |  |
| % Haze | 1.1 | — | 2.7 |  | 1.2 |  | 1.4 |  | 0.9 |  |
| 45° Gloss | 88.7 | — | 85.1 |  | 88.6 |  | 89.1 |  | 89.0 |  |
| Tensile Strength (Psi) |  |  |  | % Change |  | % Change |  | % Change |  | % Change |
| MD | 29,095 | 25,739 | −11.5 | 33,594 | +15.5 | 31,917 | +9.7 | 32,785 | +12.7 | 32,095 | +10.3 |
| TD | 51,697 | 43,528 | −15.8 | 47,425 | −8.3 | 47,475 | −8.2 | 51,093 | −1.2 | 46,595 | −9.9 |

TABLE 2-continued

| | | | | | | | | | | |
|---|---|---|---|---|---|---|---|---|---|---|
| Elongation (5) | | | | | | | | | | |
| MD | 171 | | 152 | | 140 | | 147 | | 148 | | 148 |
| TD | 51 | | 62 | | 66 | | 63 | | 59 | | 58 |
| Tensile Modulus (Psi) | | | | | | | | | | |
| MD | 380,372 | | 319,477 | −16.0 | 379,123 | −0.3 | 361,833 | −4.9 | 362,294 | −4.8 | 320,824 | −15.7 |
| TD | 744,398 | | 589,974 | −20.7 | 671,743 | −9.8 | 673,411 | −9.5 | 685,169 | −7.9 | 612,751 | −17.7 |
| Processability Rating (1-5) 1 = poor 5 = excellent | 1 | | 3 | | 4 | | 4 | | 2 | | 5 |

[1] Mw of Core Resin
[2] Mw of Modifier

It should be noted that a substantially greater fall off in tensile strength and tensile modulus (both MD and TD) occurred with the conventional prior art copolymer processing aid (Comparative Example 1), as compared to the use of the crystalline metallocene catalyzed polypropylene waxes of this invention as the processing aid. (Examples 2-5).

Although the TD tensile strength of the Control Example 1 (no processing aid) was slightly better that the TD tensile strength of the examples in accordance with this invention (Examples 2-5) the processability of the Control was woefully inadequate; resulting in non-uniform orientation; particularly in the TD and also in an unacceptable number of film breakages during TD stretching. All of the Examples within the scope of this invention were superior to Control Example 1.

Example 4 of this invention, which employed Licocene PP 6102, was the least preferred of the waxes utilized in this invention because its low viscosity adversely affected the processability of the film layer. However, the crystallinity and melting point of the Licocene PP 6102 were at an acceptable level to maintain desired physical properties, such as tensile strength and tensile modulus.

The most preferred waxes tested by applicant were Licocene PP 6502, 7502 and 2602. All three of these latter processing aids were superior in all respects to the Comparative Example 1 employing the prior art copolymer processing aid. Specifically, both the 6502 and 7502 waxes provided excellent processability properties; being rated 4 out of 5 and 2602 was given the highest possible rating of 5. However, the processability of Comparative Example 1 was rated only 3. Moreover, the 6502, 7502 and 2602 waxes provided excellent physical properties; being better than the physical properties achieved with the prior art copolymer processing aid employed in Comparative Example 1.

The results from the two sets of experiments reported above in Tables 1 and 2 also were useful in helping to establish, identify or determine a number of acceptable parameters of the invention, as follows: (1) a preferred level of incorporation, or range, of the crystalline metallocene catalyzed polypropylene waxes of this invention in the high crystalline polypropylene homopolymer to achieve desirable benefits of this invention (considered to be 3-7.5%, by weight, of the film layer including the wax); (2) the sensitivity to the additive of the melting point/drop point (results show that 132-151 C is preferred and that 86 C was less preferred because it was more detrimental to modulus retention than the other waxes that were employed in the tests; (3) a viscosity range for the additive (1700-6300 mPa was determined to be good to excellent for processability but 60 mPa was determined not to be as good).

The effect of the percent wax addition of several grades of crystalline metallocene catalyzed polypropylene wax on the degree of difficulty in stretching the polymer was measured or tested and the results are graphically represented in the FIGURE. The test was carried out by simultaneously biaxially orienting a 2 inch by 2 inch by 23 mil polymer and then determining the stretching temperature at which the yield stress of the sample was equal to 350 psi (referred to as T350). This provides a comparative measure, among the series of polymers tested, of the degree of difficulty of stretching the polymer. The response to different weight percentages of the processing aids of this invention being employed in a high crystalline, polypropylene homopolymer appears to be equivalent to or somewhat sharper (steeper) than the response to the prior art Braskem DS6D21 copolymer addition. A sharper response is indicative of superior performance.

While the invention has been described in detail and with reference to specific examples thereof, it will be apparent to one skilled in the art that various changes and modifications can be made therein without departing from the spirit and scope thereof. For example, the core layer and/or intermediate layers can be provided in any desired additives, including organic and inorganic voiding agents, e.g., calcium carbonate, polybutylene terephthalate, etc., pigments, antiblock agents, slip additives, hard resins, etc.

What we claim as the invention is the following:

1. An oriented film layer including a blend of a crystalline polypropylene wax and a high crystallinity polypropylene homopolymer.

2. The oriented film layer of claim 1, said crystalline polypropylene wax being a crystalline metallocene catalyzed polypropylene wax.

3. The oriented film layer of claim 1, including less than 10%, by weight, of the crystalline polypropylene wax.

4. The oriented film layer of claim 2, wherein said crystalline polypropylene wax is a crystalline metallocene catalyzed polypropylene wax.

5. The oriented film layer of claim 1, including less than 10%, by weight, of the crystalline polypropylene wax and over 90% of the high crystallinity polypropylene homopolymer.

6. The oriented film layer of claim 5, said crystalline polypropylene wax being a crystalline metallocene catalyzed polypropylene wax.

* * * * *